US007987637B2

(12) United States Patent  (10) Patent No.: US 7,987,637 B2
Smith  (45) Date of Patent: Aug. 2, 2011

(54) ADJUSTABLE SHIM

(76) Inventor: Patrick J. Smith, Peterborough (CA)

( * ) Notice: Subject to any disclaimer, the term of this patent is extended or adjusted under 35 U.S.C. 154(b) by 540 days.

(21) Appl. No.: 11/859,945

(22) Filed: Sep. 24, 2007

(65) Prior Publication Data

US 2008/0075556 A1 Mar. 27, 2008

Related U.S. Application Data

(60) Provisional application No. 60/826,778, filed on Sep. 25, 2006.

(51) Int. Cl.
*E06B 1/04* (2006.01)
*F16B 35/04* (2006.01)

(52) U.S. Cl. .......... 52/126.1; 52/126.4; 49/504; 49/505; 411/388

(58) Field of Classification Search .......... 52/126.1, 52/126.3, 126.4, 204.1, 217; 49/504, 505; 411/546, 535, 388, 389, 458
See application file for complete search history.

(56) References Cited

U.S. PATENT DOCUMENTS

| | | | | |
|---|---|---|---|---|
| 2,595,506 | A * | 5/1952 | Backman | 52/127.12 |
| 3,385,341 | A * | 5/1968 | Garstkiewicz | 411/134 |
| 3,570,203 | A | 3/1971 | Williams | |
| 3,571,996 | A | 3/1971 | Braswell | |
| 3,585,770 | A | 6/1971 | Maizler | |
| 3,889,423 | A | 6/1975 | Begin | |
| 3,999,339 | A * | 12/1976 | Sappenfield | 52/98 |
| 4,043,239 | A * | 8/1977 | DeFusco | 411/337 |
| 4,453,346 | A * | 6/1984 | Powell et al. | 49/404 |
| 4,662,807 | A * | 5/1987 | Lien et al. | 411/368 |
| 4,858,386 | A * | 8/1989 | Nail | 49/505 |
| 4,996,804 | A * | 3/1991 | Naka et al. | 52/126.6 |
| 5,187,898 | A * | 2/1993 | McKann | 49/505 |
| 5,205,692 | A * | 4/1993 | Kelbert et al. | 411/173 |
| 5,288,191 | A * | 2/1994 | Ruckert et al. | 411/432 |
| 5,333,423 | A * | 8/1994 | Propst | 52/126.6 |
| 5,653,078 | A * | 8/1997 | Kies et al. | 52/698 |
| 5,655,342 | A | 8/1997 | Guillemet et al. | |
| 5,655,343 | A | 8/1997 | Seals | |
| 5,772,356 | A * | 6/1998 | Collins | 403/343 |
| 6,018,916 | A * | 2/2000 | Henry | 52/126.1 |
| 6,167,663 | B1 * | 1/2001 | Nakamoto et al. | 52/217 |
| 6,213,698 | B1 * | 4/2001 | Cosenza | 411/34 |
| 6,216,402 | B1 | 4/2001 | Van de Laar | |
| 6,357,953 | B1 | 3/2002 | Balyantyne | |
| 6,584,745 | B1 * | 7/2003 | Johansson | 52/480 |

(Continued)

FOREIGN PATENT DOCUMENTS

EP 430586 A1 * 6/1991

(Continued)

*Primary Examiner* — Brian E Glessner
*Assistant Examiner* — Joseph J Sadlon
(74) *Attorney, Agent, or Firm* — Hodgson Russ LLP

(57) ABSTRACT

An adjustable shim includes a first member having a fastener opening for attachment by a screw to a frame, and a protrusion defining a coaxial threaded opening spaced from the fastener opening. A second member has a protrusion telescopically mounted on the first member and has a hollow bolt threadably located in the threaded opening coaxial with the fastener opening. The head of the hollow bolt is accessible through the second member protrusion, so that a screw can pass through the bolt to the fastener opening, and the head of the bolt is restrained from axial movement relative to the second member, so that rotation of the bolt causes the first and second members to move telescopically.

15 Claims, 3 Drawing Sheets

U.S. PATENT DOCUMENTS

| | | | |
|---|---|---|---|
| 6,585,447 B2 * | 7/2003 | Schwarzbich | 403/374.3 |
| 6,652,208 B2 * | 11/2003 | Gillis | 411/107 |
| 6,789,993 B2 * | 9/2004 | Ozawa et al. | 411/546 |
| 6,826,878 B1 | 12/2004 | Rovtar | |
| 6,884,014 B2 * | 4/2005 | Stone et al. | 411/352 |
| 7,488,135 B2 * | 2/2009 | Hasegawa | 403/48 |
| 2002/0176739 A1 * | 11/2002 | Goto et al. | 403/301 |
| 2003/0046885 A1 * | 3/2003 | Tavivian | 52/204.1 |
| 2005/0166483 A1 * | 8/2005 | Mead | 52/126.7 |

FOREIGN PATENT DOCUMENTS

GB 2201181 A * 8/1988

* cited by examiner

ADJUSTABLE SHIM

CROSS-REFERENCE TO RELATED APPLICATION

This application claims the benefit of priority to U.S. provisional patent application Ser. No. 60/826,778, filed on Sep. 25, 2006, the disclosure of which is incorporated by reference herein.

FIELD OF THE INVENTION

This invention relates to doors and windows, and in particular, to shim devices for mounting an exterior door or window in a frame.

BACKGROUND OF THE INVENTION

The installation of exterior doors and windows in the construction industry usually involves making a framed opening and installing a door or window in this opening. Normally, the door or window is smaller in size than the framed opening and shims are used to align or plumb the door. A problem is that this can be very time consuming and often requires more than one person to do the installation.

In order to make the installation of a door easier, for example, it has been proposed to incorporate a shim device into the door jamb, so that the door, door jamb and shim device form a preassembly. This preassembly then needs only to be located in the door frame opening and the shim device actuated to plumb the door. A difficulty with known devices, however, is that the shim devices only expand outwardly, so to adjust the position of a door, the shim devices have to be located on either side of the door and adjusted almost simultaneously. This is difficult to do, especially for one person.

SUMMARY OF THE INVENTION

The adjustable shim of the present invention has a first member that can be attached to the door or window frame, and a second telescoping member mounted in the door assembly or window frame. A threaded connector provides two-way adjustment between the telescoping members, so that the door or window position can be changed by turning the threaded connectors in individual adjustable shims.

According to one aspect of the invention, there is provided an adjustable shim comprising a first member having a bottom wall portion defining a fastener opening therein. The first member also defines a threaded opening spaced from the fastener opening and disposed coaxially with the fastener opening. A second member is telescopically mounted on the first member. The second member has an outer wall portion defining an access opening disposed remotely from and coaxially with the first member threaded opening. A hollow bolt is threadably located in the first member threaded opening coaxially with the access and fastener openings. The bolt has a head located adjacent to the access opening. Means are provided for rotatably retaining the bolt head adjacent to the access opening, and means are provided for preventing relative rotation between the first and second members, so that rotation of the bolt head by a tool passing through the access opening causes the second member to move telescopically relative to the first member.

According to another aspect of the invention, there is provided a pre-shimmed panel assembly, such as a door or a window, comprising a panel and a peripheral jamb. A plurality of spaced-apart, adjustable shims are mounted on the jamb. The adjustable shims each include a first member having a bottom wall portion defining a fastener opening therein for attaching the first member to a frame structure adjacent to the jamb. The first member also defines a threaded opening spaced from the fastener opening and disposed coaxially with the fastener opening. The adjustable shims each also include a second member telescopically mounted on a respective first member. The second member has an outer wall portion attached to the jamb and defining an access opening disposed remotely from and coaxially with the first member threaded opening. The adjustable shims each also include a hollow threaded bolt located in the first member threaded opening coaxially with the access and the fastener openings. The bolt has a head located adjacent to the respective access opening. Means are provided for rotatably retaining the bolt heads adjacent to their respective access openings. Also, means are provided for preventing relative rotation between the first and second members, so that rotation of the bolt heads by a tool passing through the access openings causes the second member to move telescopically relative to the first member.

According to yet another aspect of the invention, there is provided a method of mounting a panel assembly, such as a door or window, in a frame. The method comprises the steps of providing a pre-shimmed panel assembly as described next above. One of the adjustable shim first members is attached to the frame by passing a screw through the access opening, the hollow bolt and the fastener opening and screwing the screw into the frame. At least one other adjustable shim first member is attached to the frame by passing a screw through the respective access opening, hollow bolt and fastener opening and screwing the screw into the frame. The hollow bolts are then turned to plumb the panel by passing a tool through the access openings to turn the bolts until the panel is plumb.

An adjustable shim forms yet another aspect of the invention. This shim comprises: a first member having a bottom wall portion defining a fastener opening therein, the first member also defining a threaded opening spaced from the fastener opening and disposed coaxially with the fastener opening; a second member telescopically mounted on the first member, the second member having an outer wall portion defining an access opening disposed remotely from and coaxially with the first member threaded opening; a hollow bolt threadably located in the first member threaded opening coaxially with the access and fastener openings, the bolt having a head located adjacent to the access opening and being rotatably mounted to the second member. If the first and second members are arrested against relative rotation, rotation of the bolt head relative to the first and second members causes the second member to move telescopically relative to the first member.

According to another aspect, the bolt can have a central hollow opening leading between the access opening and the fastener opening.

According to yet another aspect, adjacent to the access opening, the bolt can terminate in an end adapted to be turned by a tool selected from the group of tools consisting of an Allen key, a Torx wrench and a screwdriver.

According to yet another aspect, the first member and the second member are mounted to one another in a manner which arrests relative rotation.

According to yet another aspect, the central hollow opening, the access hole and the fastener opening can be sized to permit a screw to be inserted through the access opening and bolt to secure the first member to a door frame in use.

A pre-shimmed panel assembly, such as a door or window, forms another aspect of the invention. This assembly comprises: a panel and a peripheral jamb; a plurality of spaced-apart, adjustable shims mounted on the jamb; the adjustable shims each including a first member having a bottom wall portion defining a fastener opening therein for attaching the first member to a frame structure adjacent to the jamb; the first member also defining a threaded opening spaced from the fastener opening and disposed coaxially with the fastener opening; the adjustable shims each also including a second member telescopically mounted on a respective first member, the second member having an outer wall portion attached to the jamb and defining an access opening disposed remotely from and coaxially with the first member threaded opening; the adjustable shims each also including a hollow bolt threadably located in the first member threaded opening coaxially with the access and fastener openings, the bolt having a head located adjacent to the respective access opening; and a locking arrangement for preventing relative rotation between the first and second members, so that rotation of the bolt heads causes the second member to move telescopically relative to the first member.

According to another aspect, the bolt can have a central hollow opening leading between the access opening and the fastener opening.

According to another aspect, adjacent to the access opening, the bolt can terminate in an end adapted to be turned by a tool selected from the group of tools consisting of an Allen key, a Torx wrench and a screwdriver.

According to yet another aspect, the locking arrangement can be defined by the interaction between the first member and the second member.

According to another aspect, the locking arrangement is defined by: screws fixedly securing the second member to the jamb; a hole defined in the jamb; and a lateral pin projecting from the first member into the hole.

According to another aspect, the central hollow opening, the access hole and the fastener opening are sized to permit a screw to be inserted through the access opening and bolt to secure the first member to a door frame in use.

According to another aspect, the adjustable shims are positioned and adapted to permit, in use, the first members to be secured to a framed door opening; and the assembly to be plumbed in the door frame once secured, from one side of the door, only, and without opening the door.

BRIEF DESCRIPTION OF THE DRAWINGS

Preferred embodiments of the invention will now be described, by way of example, with reference to the accompanying drawings, in which.

DESCRIPTION OF EXEMPLARY EMBODIMENTS

Figure 1:
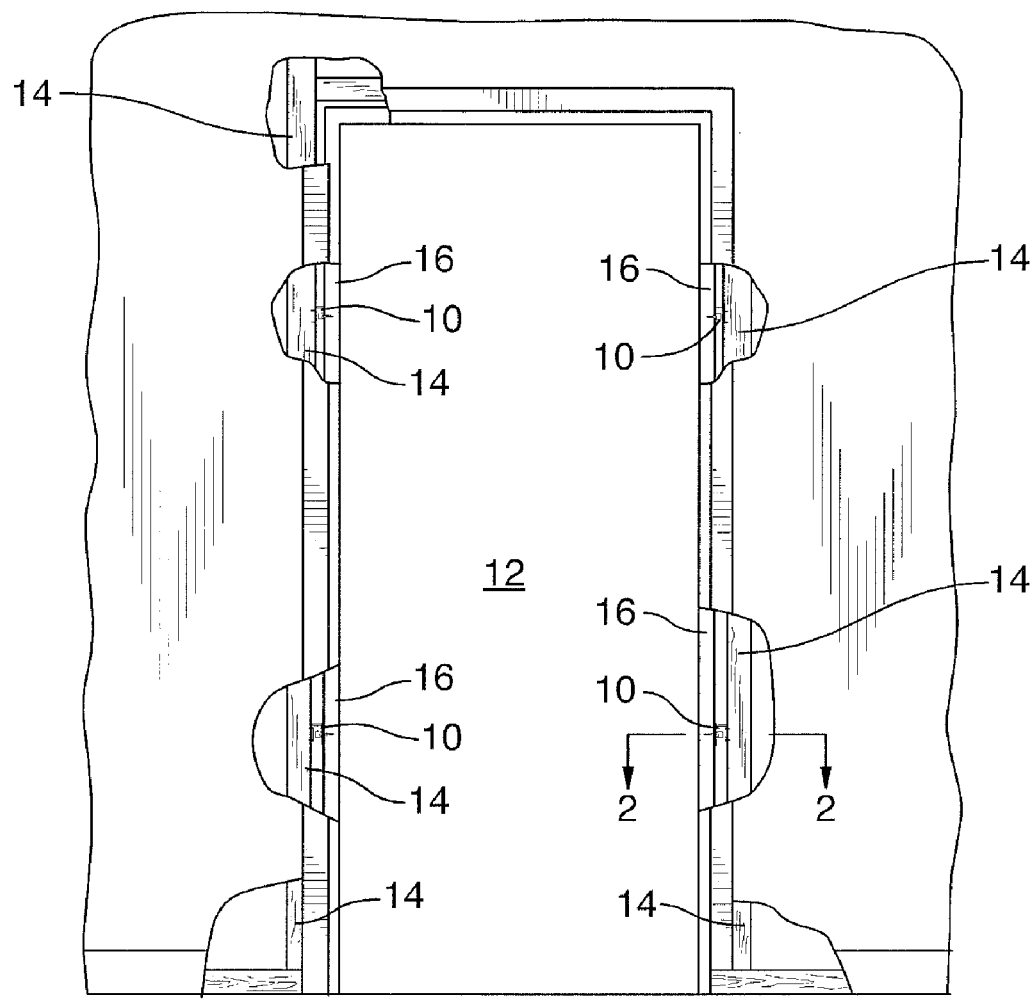
FIG. 1 is an elevational view, partly broken away, of a door mounted in a door frame using a preferred embodiment of an adjustable shim according to the present invention.
Figure 2:
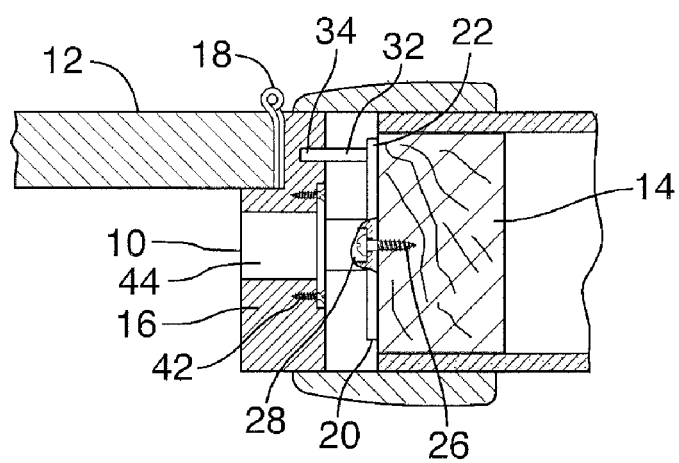
FIG. 2 is a partial cross-sectional view taken along lines 2-2 of FIG. 1.

Referring to the drawings, an exemplary embodiment of an adjustable shim according to the present invention is generally indicated by reference numeral 10. Shim 10 is shown in FIGS. 1 and 2 as being used to mount or install a door 12 in a framed opening or a door frame 14. Door 12 is mounted on a doorjamb 16 using hinges 18 (see FIG. 2). One adjustable shim 10 is usually located adjacent to each hinge 18, and adjustable shims 10 are usually located on each side of the door as indicated in FIG. 1, although the shims could be used only on the hinge side of the door if desired, especially for lighter doors. In that case, at the non-hinged side of the door, the jamb 16 would be secured to the frame 14 in a conventional manner.

Figure 3:
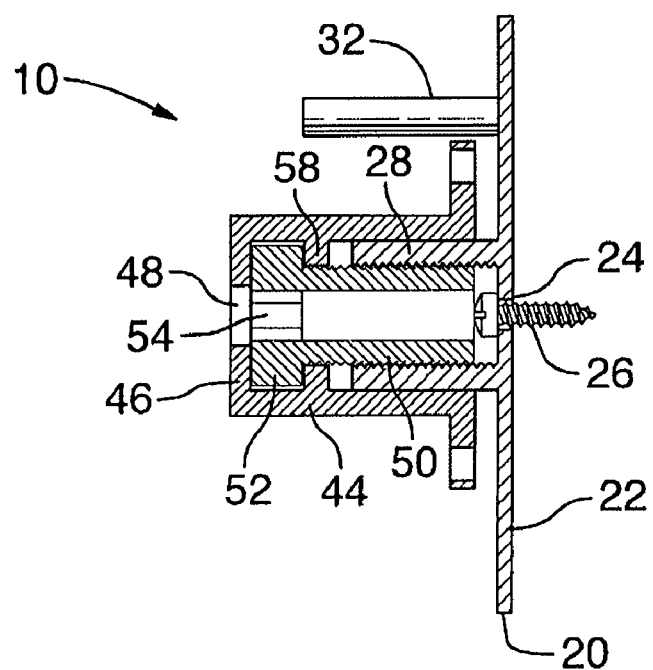
FIG. 3 is an enlarged cross-sectional view similar to FIG. 2, but of the adjustable shim only.
Figure 4:
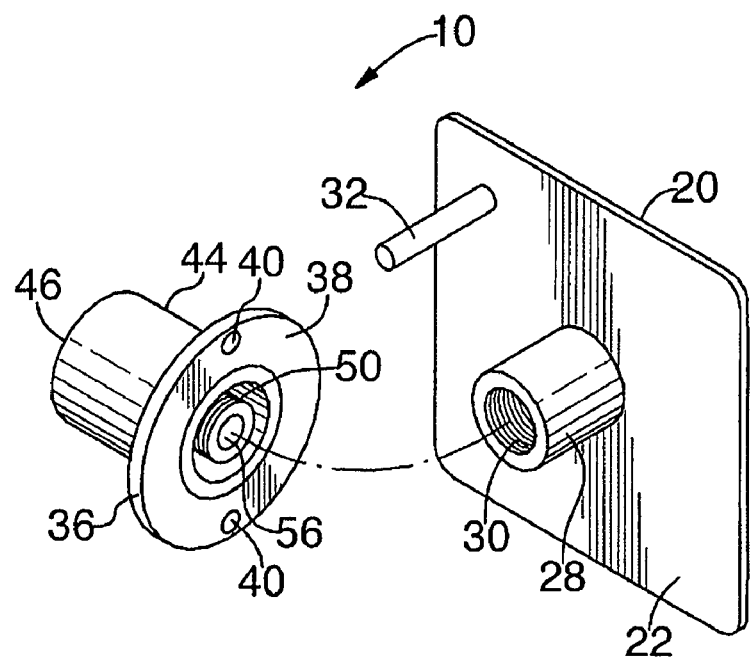
FIG. 4 is an exploded view of the adjustable shim shown in FIG. 3.

Referring next to FIGS. 2, 3 and 4, adjustable shim 10 includes a first member 20 having a bottom wall portion 22. Bottom wall portion 22 defines a fastener opening 24 (see FIG. 3), and a screw 26 passes through fastener opening 24 to secure or attach first member 20 to door frame 14 (see FIG. 2).

First member 20 also includes a central shaft or protrusion 28 which defines an interior threaded opening 30 disposed coaxially with the fastener opening 24. At least a portion of the threaded opening 30 is spaced from or located remote from fastener opening 24 to allow for the adjustment of shim 10, as will be described further below.

First member 20 also includes a lateral pin 32, which fits slidably into a hole 34 in door jamb 16 (see FIG. 2) to prevent rotation of first member 20 during the adjustment of shim 10.

Shim 10 also includes a second member 36 telescopically or slidably mounted on first member 20. Second member 36 includes a plate 38 having holes 40 for attaching second member 36 to door jamb 16 using screws 42 as indicated in FIG. 2. Second member 36 also has a central shaft or protrusion 44. Central shaft 44 has an outer wall portion 46 (see FIG. 3) and outer wall portion 46 defines an access opening 48 disposed remotely from and coaxially with a first member threaded opening 30 and fastener opening 24.

A hollow bolt 50 has a head 52 located adjacent to the access opening 48, and head 52 is either slotted or has a cavity 54, so that bolt 50 may be turned by inserting a tool such as a screwdriver or an Allen wrench through access opening 48. Bolt 50 has a central hollow opening 56, so that screw 26 can be inserted through access opening 48 and bolt 50 to secure first member 20 to door frame 14.

Second member 36 also has an inwardly disposed annular flange 58 (see FIG. 3) which rotatably retains bolt head 52 adjacent to access opening 48. This permits first and second members 20 and 36 to be moved telescopically toward and away from one another by rotating bolt 50 clockwise or counterclockwise as desired.

Figure 5:
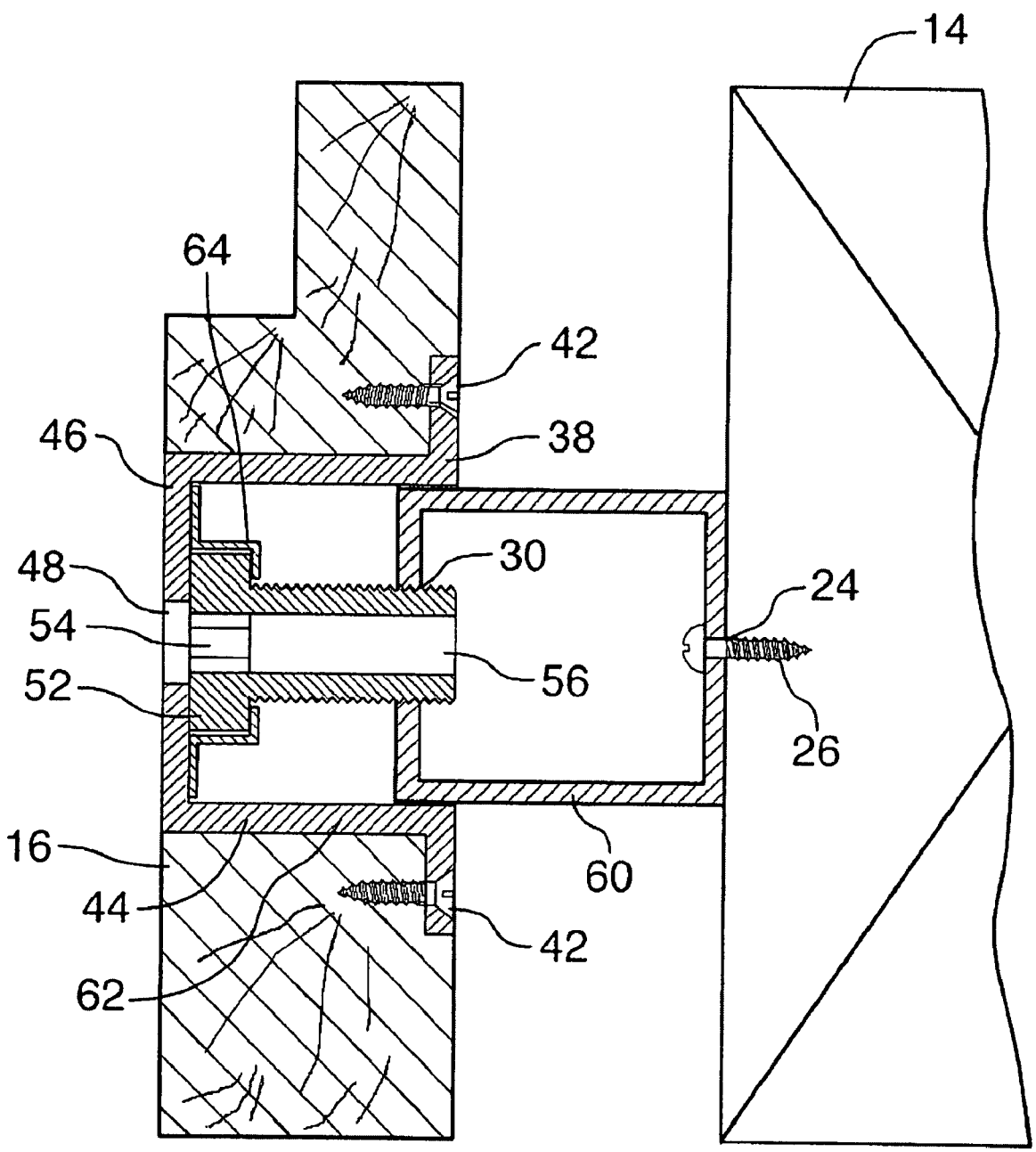
FIG. 5 is a cross-sectional view similar to FIG. 2 but showing another preferred embodiment of an adjustable shim according to the present invention.

Referring next to FIG. 5, like reference numerals are used to indicate components that are similar to those of the embodiments shown in FIGS. 2 to 4. In the embodiment in FIG. 5, however, the first member 60 is a square or rectangular bracket preferably formed out of a short length of square tubing. Second member 62 is formed of a piece of flat bar stock bent to form protrusion 44 to slidingly or telescopically accept first member 60. An inner bracket 64 retains the bolt head 52 adjacent to access opening 48. Bracket 64 preferably is spot welded in place, but it may be attached in any other manner.

It will be appreciated that the annular flange 58 in FIG. 3 and bracket 64 in FIG. 5 are means for rotatably retaining bolt head 52 adjacent to access opening 48. In the embodiment of FIGS. 2 to 4, the lateral pin 32 is means for preventing relative rotation between the first and second members 20 and 36. In the FIG. 5 embodiment, the nested square shape of the first and second members 60, 62 is means for preventing relative rotation between the first and second members 60, 62.

Normally, the door 12, door jamb 16 and adjustable shims 10 would be preassembled as a kit for a contractor or installer and thus form a pre-shimmed panel assembly. In this case, the central shafts or protrusions 44 of the second members 36, 62 would be pre-mounted in holes in door jamb 16 at predetermined locations. However, adjustable shims 10 could be used with any type of door jamb, or they could be used to install other framed structures, such as windows, simply by drilling holes in the door jamb or window frame to accommodate second members 36 or 62 at desired locations. For the purposes of this disclosure, the term "panel" is used to describe the article being installed, such as a door or a window, and "panel assembly" includes the addition of a jamb or outer frame structure.

After the adjustable shims 10 are mounted in the panel or panel assembly, the panel is installed simply by locating it in a suitably dimensioned framed opening. Screws 26 are inserted through access openings 48 to attach the first members 20 or 60 to the frame 14. The bolts 50 would then be turned to adjust the shims and plumb or align the panel. If there were adjustable shims 10 on the other side of the panel, the bolts 50 on them can be turned to make the first members 20 or 60 engage the adjacent frame 14 and screws 26 can then be inserted through the shim members to attach the first members 20 or 60 to frame 14. A benefit associated with the preferred embodiment of the invention is that installation and shimming can be carried out wholly on one side of the door, without any need to open the door. This provides for a relatively quick installation. At the same time, keeping the door in the jamb throughout the shimming process helps keep the jamb square. After installation, the access openings 48 or the outer wall portions 46 can be plugged or covered with suitable decorative caps, or the access openings 48 can be filled in, and the door jamb painted to conceal the adjustable shims, if desired.

Having described preferred embodiments of the invention, it will appreciated that various modifications may be made to the structures described above. For example, the first and second members of the adjustable shims can of other configurations. The adjustable shim can be used for purposes other than mounting doors or windows. For example, the shims can be used as leveling feet for furniture and appliances.

From the foregoing, it will be evident to persons of ordinary skill in the art that the scope of the present invention is limited only by the accompanying claims, purposively construed.

The invention claimed is:

1. An adjustable shim comprising:
    a first member having a bottom wall portion defining a fastener opening therein, the first member also defining a threaded opening spaced from the fastener opening and disposed coaxially with the fastener opening;
    a second member telescopically mounted on the first member, the second member having an outer wall portion defining an access opening disposed remotely from and coaxially with the first member threaded opening, and wherein the first member is received within the second member;
    a hollow bolt threadably located in the first member threaded opening coaxially with the access and fastener openings, the bolt having a head located adjacent to the access opening;
    means for rotatably retaining the bolt head adjacent to the access opening; and
    means for preventing relative rotation between the first and second members, so that rotation of the bolt head by a tool passing through the access opening causes the second member to move telescopically relative to the first member.

2. A pre-shimmed panel assembly selected from the group consisting of door assembly and window assembly and comprising:
    a door or window panel and a peripheral jamb;
    a plurality of spaced-apart, adjustable shims mounted on the jamb;
    the adjustable shims each including a first member having a bottom wall portion defining a fastener opening therein for attaching the first member to a frame structure adjacent to the jamb;
    the first member also defining a threaded opening spaced from the fastener opening and disposed coaxially with the fastener opening;
    the adjustable shims each also including a second member telescopically mounted on a respective first member, the second member having an outer wall portion attached to the jamb and defining an access opening disposed remotely from and coaxially with the first member threaded opening;
    the adjustable shims each also including a hollow bolt threadably located in the first member threaded opening coaxially with the access and fastener openings, the bolt having a head located adjacent to the respective access opening;
    means for rotatably retaining the bolt heads adjacent to their respective access openings; and
    means for preventing relative rotation between the first and second members, so that rotation of the bolt heads by a tool passing through the access openings causes the second member to move telescopically relative to the first member.

3. A method of mounting a panel in a frame, the panel selected from the group consisting of door and window and the method comprising the steps of:
    providing a pre-shimmed panel assembly as claimed in claim 2;
    attaching one of the adjustable shim first members to the frame by passing a screw through the access opening, the hollow bolt and the fastener opening and screwing the screw into the frame;
    attaching at least one other adjustable shim first member to the frame by passing a screw through the respective access opening, hollow bolt and fastener opening and screwing the screw into the frame; and
    turning the hollow bolts to plumb the panel by passing a tool through the access openings to turn the bolts until the panel is plumb.

4. An adjustable shim comprising:
    a first member having a bottom wall portion defining a fastener opening therein, the first member also defining a threaded opening spaced from the fastener opening and disposed coaxially with the fastener opening;
    a second member telescopically mounted on the first member, the second member having an outer wall portion defining an access opening disposed remotely from and coaxially with the first member threaded opening, and wherein the first member is received within the second member;
    a hollow bolt threadably located in the first member threaded opening coaxially with the access and fastener openings, the bolt having a head located adjacent to the access opening and being rotatably mounted to the second member;
    whereby, if the first and second members are arrested against relative rotation, rotation of the bolt head relative to the first and second members causes the second member to move telescopically relative to the first member.

5. An adjustable shim according to claim 4, wherein the bolt has a central hollow opening leading between the access opening and the fastener opening.

6. An adjustable shim according to claim 5, wherein, adjacent to the access opening, the bolt terminates in an end adapted to be turned by a tool selected from the group of tools consisting of an Allen key, a Torx wrench and a screwdriver.

7. An adjustable shim according to claim 3, wherein the first member and the second member are mounted to one another in a manner which arrests relative rotation.

8. An adjustable shim according to claim 5, wherein the central hollow opening, the access opening and the fastener opening are sized to permit a screw to be inserted through the access opening and bolt to secure the first member to a door frame in use.

9. A pre-shimmed panel assembly selected from the group consisting of door panel assembly and window panel assembly and comprising:
   a door or window panel and a peripheral jamb;
   a plurality of spaced-apart, adjustable shims mounted on the jamb;
   the adjustable shims each including a first member having a bottom wall portion defining a fastener opening therein for attaching the first member to a frame structure adjacent to the jamb;
   the first member also defining a threaded opening spaced from the fastener opening and disposed coaxially with the fastener opening;
   the adjustable shims each also including a second member telescopically mounted on a respective first member, the second member having an outer wall portion attached to the jamb and defining an access opening disposed remotely from and coaxially with the first member threaded opening;
   the adjustable shims each also including a hollow bolt threadably located in the first member threaded opening coaxially with the access and fastener openings, the bolt having a head located adjacent to the respective access opening; and
   a locking arrangement for preventing relative rotation between the first and second members, so that rotation of the bolt heads causes the second member to move telescopically relative to the first member.

10. An assembly according to claim 9, wherein the bolt has a central hollow opening leading between the access opening and the fastener opening.

11. An assembly according to claim 10, wherein, adjacent to the access opening, the bolt terminates in an end adapted to be turned by a tool selected from the group of tools consisting of an Allen key, a Torx wrench and a screwdriver.

12. An assembly according to claim 9, wherein the locking arrangement is defined by the interaction between the first member and the second member.

13. An assembly according to claim 9, wherein the locking arrangement is defined by:
   screws fixedly securing the second member to the jamb;
   a hole defined in the jamb; and
   a lateral pin projecting from the first member into the hole.

14. An assembly according to claim 9, wherein the central hollow opening, the access opening and the fastener opening are sized to permit a screw to be inserted through the access opening and bolt to secure the first member to a door frame in use.

15. An assembly according to claim 14, wherein the adjustable shims are positioned and adapted to permit, in use,
   the first members to be secured to a framed door opening; and
   the assembly to be plumbed in the door frame once secured, from one side of the door, only, and without opening the door.

* * * * *